United States Patent [19]

Takeuchi et al.

[11] Patent Number: 5,376,915
[45] Date of Patent: Dec. 27, 1994

[54] ABSOLUTE VALUE COMPARING APPARATUS FOR COMPARING ABSOLUTE VALUES OF DATA AT HIGH SPEED

[75] Inventors: Sumitaka Takeuchi; Masao Ito, both of Hyogo, Japan

[73] Assignee: Mitsubishi Denki Kabushiki Kaisha, Tokyo, Japan

[21] Appl. No.: 43,710

[22] Filed: Apr. 8, 1993

[30] Foreign Application Priority Data

Jun. 25, 1992 [JP] Japan .................. 4-167525

[51] Int. Cl.$^5$ .............................. G06F 7/02
[52] U.S. Cl. .................... 340/146.2; 377/33; 326/105
[58] Field of Search ............ 340/146.2; 307/463; 377/33, 34

[56] References Cited

U.S. PATENT DOCUMENTS

| | | | |
|---|---|---|---|
| 3,942,171 | 3/1976 | Haraszti et al. | 377/33 |
| 4,344,005 | 8/1982 | Stewart | 307/463 |
| 4,429,238 | 1/1984 | Harrison | 307/463 |
| 4,471,310 | 9/1984 | Yenisey | 377/33 |
| 5,034,630 | 7/1991 | Sugiyama et al. | 307/463 |

FOREIGN PATENT DOCUMENTS 57-49618 7/1989 Japan .

*Primary Examiner*—John S. Heyman
*Attorney, Agent, or Firm*—Lowe, Price, LeBlanc & Becker

[57] ABSTRACT

Disclosed is an absolute value comparator for comparing respective absolute values of sequentially applied two data. A decoder circuit sequentially converts the applied data into a plurality of bit signals in accordance with a predetermined rule. After a preceding conversion bit signal is once held in a register circuit, the held bit signal is inverted for each bit by an inversion circuit. Thus, a logic circuit receives a preceding inverted bit signal and a succeeding conversion bit signal and outputs an output signal B indicating the result of comparison. Since a full adder is unnecessary, a comparison between the absolute values of the applied data can be made at a high speed.

15 Claims, 11 Drawing Sheets

ABSOLUTE VALUE COMPARING APPARATUS FOR COMPARING ABSOLUTE VALUES OF DATA AT HIGH SPEED

BACKGROUND OF THE INVENTION

1. Field of the Invention

The present invention relates generally to absolute value comparing apparatuses and, more particularly, to an absolute value comparing apparatus for comparing absolute values of applied data at a high speed. The invention has a particular applicability to video signal processing apparatuses.

2. Description of the Background Art

Processings for comparing data are frequently carried out in general in various electronic apparatuses, typically computers. In some case, a processing for comparing absolute values of data is often necessary. In an image input apparatus requiring a real time processing, for example, a high speed comparison processing with respect to absolute values of image data is required in order to detect a motion vector from the image data. The present invention is applicable in general to absolute value comparing apparatuses for comparing absolute values of applied data at a high speed. A brief description will now be made on a video signal processing apparatus as an example of a field of art in which a processing for comparing absolute values of data is required.

FIG. 13 is a block diagram of a video signal processing apparatus employing an absolute value comparator. With reference to FIG. 13, this video signal processing apparatus includes an A/D converter 90 for receiving a video signal to be processed, field memories 91 and 92 for storing converted video data therein for each field, a correlation operating unit 94 for evaluating a correlation between fields with respect to video data, a motion vector detector 95 for detecting a motion vector on the basis of the evaluated correlation, an image correcting circuit 96 for carrying out an image correcting processing with respect to video data in accordance with the motion vector, and a decoder 97 for decoding corrected data to output an image signal.

The video signal processing apparatus shown in FIG. 13 is applied in, for example, a portable image input apparatus requiring a real time processing. Since a motion vector which is necessary to carry out an image correction is detected from an applied video signal, the correlation operating unit 94 incorporating an absolute value comparator 93 is provided prior to the motion vector detector 95. The correlation operating unit 94 is implemented by software (or programming) in some case; however, the unit 94 is unable to process data at high speed in that case. For achieving a high speed data processing, the correlation operating unit 94 is constituted by hardware, i.e., an electronic circuit.

It is thus desirable that the absolute value comparator 93 incorporated in the correlation operating unit 94 is also constituted by hardware in order to achieve a high speed processing. The absolute value comparator 93 sequentially receives video data of two fields stored in the field memories 91 and 92 and compares absolute values of the received data. In some case, the absolute value comparator 93 receives video data at the same time directly from each of the field memories 91 and 92 as shown by the dotted line of FIG. 13, and compares absolute values of two field data. The absolute value comparator 93 determines the magnitude of the absolute values of the two applied data, and outputs a difference between the two absolute value data, a total sum of the difference between sequentially applied two absolute value data, and the like.

As described above, when the absolute value comparator 93 is implemented by software, a high processing speed is not obtained, and hence, the absolute value comparator 93 is constituted by hardware, i.e., an electronic circuit. In such an absolute value comparator circuit, however, (1) it is necessary to determine a positive or a negative of two applied data before an operation is carried out, and (2) a delay in transmission of a carry signal cannot be avoided in a full adder for performing addition and subtraction of two applied data. Thus, a comparing processing is time-consuming, and a high processing speed is not obtained. The delay of the carry signal in the full adder becomes increased with an increase in the number of bits of data to be compared, resulting in a large problem in the actual absolute value comparator. Further, an area on a semiconductor substrate occupied by the absolute value comparator 93 is reduced, which implies an importance of simplification of a circuit configuration.

SUMMARY OF THE INVENTION

One object of the present invention is to provide an absolute value comparing apparatus capable of comparing absolute values of two applied data at a high speed.

Another object of the present invention is to compare absolute values of sequentially applied two data in a short time in an absolute value comparing apparatus.

A further object of the present invention is to compare absolute values of simultaneously applied two data in a short time in an absolute value comparing apparatus.

Briefly, an absolute value comparing apparatus in accordance with the present invention includes a conversion circuit for converting first and second data into first and second conversion bit signals each having a plurality of bits in accordance with a predetermined rule, an inversion circuit for inverting each bit of the first conversion bit signals to output inversion bit signals, a logical product circuit for operating a logical product for each of corresponding bits between the second conversion bit signals and the inversion bit signals and outputting a plurality of logical product signals, and a logical sum circuit for operating a logical sum with respect to the plurality of logical product signals and outputting a logical sum signal. For each of the first and second conversion bit signals, the number of bits representing a first logic increases in proportion to absolute values of corresponding data of the first and second data.

In operation, since a full adder is unnecessary, a delay caused by use of the full adder is prevented. In addition, it is pointed out that an absolute value comparing apparatus having a simplified structure can be provided.

According to another aspect of the present invention, an absolute value comparing apparatus includes a conversion circuit for converting first and second data into first and second conversion bit signals each having a plurality of bits in accordance with a predetermined rule, a logical sum circuit for operating a logical sum for each of corresponding bits between the first and second conversion bit signals and outputting a plurality of logical sum signals, and an inverse conversion circuit for inversely converting the plurality of logic sum signals in accordance with a predetermined rule and selectively outputting one of the first and second data. For each of the first and second conversion bit signals, the number of bits representing a first logic is increased in proportion to absolute values of corresponding data of the first and second data.

In operation, since the absolute value comparing apparatus further includes the inverse conversion circuit, in addition to the foregoing advantage, one of two data which has a higher absolute value or a lower absolute value can be selectively output.

According to still another aspect of the present invention, an absolute value comparing apparatus includes a conversion circuit for converting first and second data into first and second conversion bit signals each having a plurality of bits in accordance with a predetermined rule, a logical product circuit for operating a logical product for each of corresponding bits between the first and second conversion bit signals and outputting a plurality of logical product signals, and an inverse conversion circuit for inversely converting the plurality of logical product signals in accordance with a predetermined rule and selectively outputting one of the first and second data. For each of the first and second conversion bit signals, the number of bits representing a first logic is increased in proportion to absolute values of corresponding data of the first and second data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
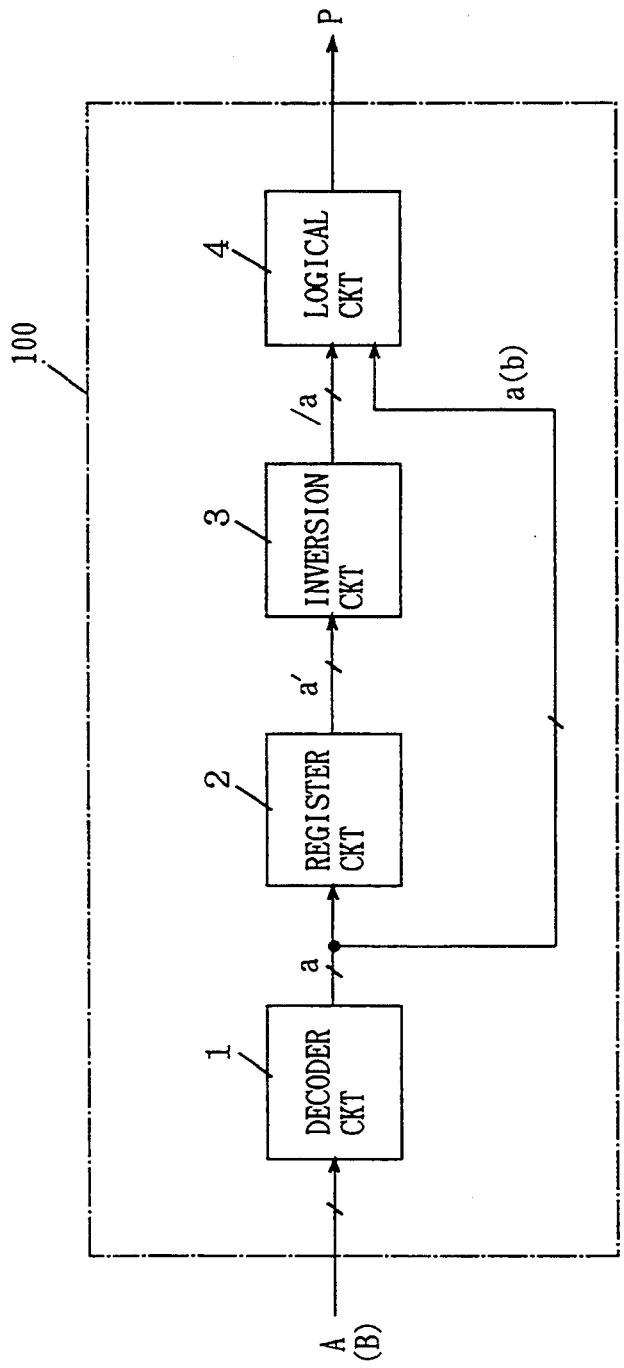
FIG. 1 is a block diagram of an absolute comparator showing one embodiment of the present invention.

With reference to FIG. 1, an absolute value comparator 100 includes a decoder circuit (or a conversion circuit) 1 receiving input data A (and B) represented in two's complement notation, a register circuit 2 for holding a plurality of bit signals a output from the decoder circuit 1, an inversion circuit 3 for inverting for each bit a plurality of bit signals a' output from the register circuit 2, and a logic circuit 4 for receiving an inverted bit signal /a and a bit signal a output from the decoder circuit 1. Input data to be compared are applied sequentially to the decoder circuit 1. This absolute value comparator 100 compares respective absolute values of sequentially applied two input data and outputs an output signal P indicating the result of comparison via the logic circuit 4.

A relationship between the input data A and the output bit signals a with respect to the decoder circuit 1 shown in FIG. 1 is shown in Table 1 below.

TABLE 1

| Decimal notation | Two's complement notation | | | Conversion bit signals | | | |
|---|---|---|---|---|---|---|---|
| | A2 | A1 | A0 | a3 | a2 | a1 | a0 |
| −1 | 1 | 1 | 1 | 0 | 0 | 0 | 1 |
| −2 | 1 | 1 | 0 | 0 | 0 | 1 | 1 |
| −3 | 1 | 0 | 1 | 0 | 1 | 1 | 1 |
| −4 | 1 | 0 | 0 | 1 | 1 | 1 | 1 |
| 3 | 0 | 1 | 1 | 0 | 1 | 1 | 1 |
| 2 | 0 | 1 | 0 | 0 | 0 | 1 | 1 |
| 1 | 0 | 0 | 1 | 0 | 0 | 0 | 1 |
| 0 | 0 | 0 | 0 | 0 | 0 | 0 | 0 |

In the example shown in Table 1, data (A2, A1, A0) of 3 bits represented in two's complement notation are shown as the input data A. That is, the decoder circuit 1 shown in FIG. 1 receives the input data (A2, A1, A0) represented in the two's complement notation. Numbers represented in a decimal notation corresponding to the respective input data (A2, A1, A0) are shown in Table 1. For example, "$3_{10}$" in the decimal notation corresponds to (0, 1, 1) in the two's complement notation.

The decoder circuit 1 receives the input data (A2, A1, A0) in the two's complement representation and converts the received input data into a plurality of bit signals a in accordance with a predetermined rule. The converted bit signals (a3, a2, a1, a0) are shown in Table 1. For example, when input data represented in the two's complement notation are (0, 1, 1), the decoder circuit 1 outputs (0, 1, 1, 1) as the converted bit signals (a3, a2, a1, a0).

The bit A2 in the two's complement representation denotes a sign bit. That is, when input data is positive, the sign bit A2 is "0". Conversely, when the input data is negative, the sign bit A2 is "1".

The decoder circuit 1 sequentially converts sequentially applied input data (A2, A1, A0) in the two's complement representation to bit signals (a3, a2, a1, a0) in accordance with the rule shown in Table 1, i.e, a predetermined rule. In a case where the decoder circuit 1 is constituted by hardware, i.e., an electronic circuit, a circuit configuration shown in FIG. 2 is provided.

Figure 2:
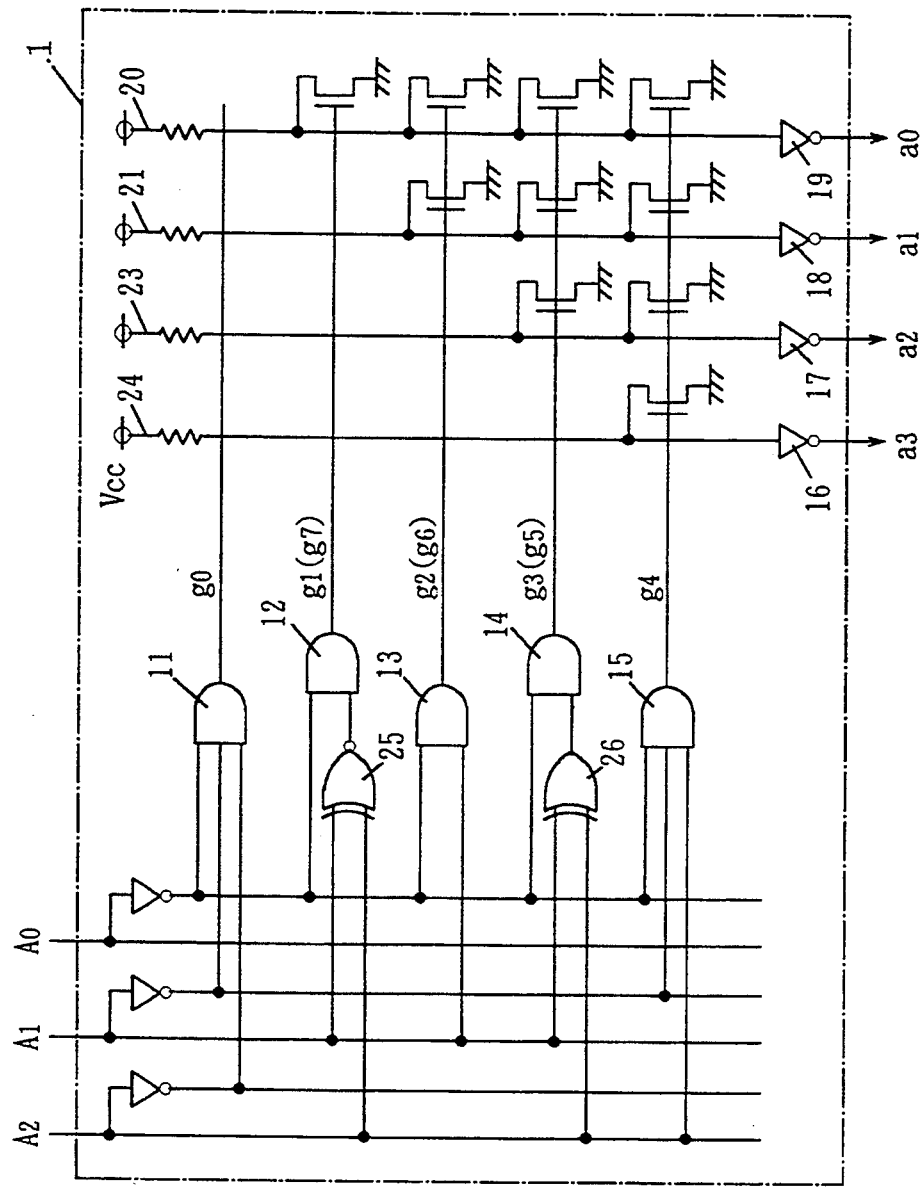
FIG. 2 is a schematic diagram of a decoding circuit shown in FIG. 1.

FIG. 2 is a schematic diagram of the decoder circuit 1 shown in FIG. 1. With reference to FIG. 2, the decoder circuit 1 includes AND gates 11–15, inverters 16–19, an EX-NOR gate 25, an EX-OR gate 26, signal lines 20–24, and an NMOS transistor selectively connected between the signal lines 20–24 and ground. Respective bit signals A2, A1 and A0 of input data in the two's complement representation and inversion signals of these bit signals are selectively applied to the AND gates 11–15, the EX-NOR gate 25 and the EX-OR gate 26. Accordingly, only when (A2, A1, A0)=(0, 0, 0), the AND gate 11 outputs an output signal g0 of "1" or a logic high level. The AND gate 12 outputs an output signal g1 or g7 of "1" only when (A2, A1, A0)=(0, 0, 1) or (1, 1, 1). The AND gate 13 outputs an output signal g2 or g6 of "1" only when (A2, A1, A0)=(0, 1, 0) or (1, 1, 0). The AND gate 14 outputs an output signal g3 or g5 of "1" only when (A2, A1, A0)=(0, 1, 1) or (1, 0, 1). The AND gate 15 outputs an output signal g4 of "1" only when (A2, A1, A0)=(1, 0, 0).

Accordingly, one of the AND gates 11–15 responds to the input data (A2, A1, A0) to selectively output an output signal of "1" When the output signal g0 is "1", (0, 0, 0, 0) are output as conversion bit signals (a3, a2, a1, a0) via the inverters 16–19. When the output signal g1 or g7 is "1", conversion bit signals (0, 0, 0, 1) are output. When the output signal g2 or g6 is "1", conversion bit signals (0, 0, 1, 1) are output. When the output signal g3 or g5 is "1", conversion bit signals (0, 1, 1, 1) are output. When the output signal g4 is "1", conversion bit signals (1, 1, 1, 1) are output. As a result, it is understood that the decoder circuit 1 shown in FIG. 2 meets the relationship shown in Table 1. In other words, the relationship between the input data and the conversion bit signals represented in Table 1 can be realized by the circuit shown in FIG. 2.

Assume that two input data to be compared are input data A and B and that these data A and B are converted into conversion bit signals ($a_n$, $a_{n-1}$, ..., $a_0$) and ($b_n$, $b_{n-1}$, ..., $b_0$) by the decoder circuit 1. The conversion bit signals $a_n$–$a_0$ are once held in the register circuit 2, and the held bit signals $a_n'$–$a_0'$ are then applied to the inversion circuit 3. The inversion circuit 3 inverts the applied signals for each bit with respect to the applied bit signals $a_n$–$a_0$. Consequently, inverted bit signals $/a_n$–$/a_0$ and the conversion bit signals $b_n$–$b_0$ of the other input data are applied simultaneously to the logic circuit 4. The logic circuit 4 is comprised of a logic circuit expressed by the following logical expression.

$$P = /a_n \cdot b_n + /a_{n-1} \cdot b_{n-1} + \ldots + /a_0 \cdot b_0 \quad (1)$$

That is, the logic circuit 4 receives two sets of bit signals $/a_n$–$/a_0$ and $b_n$–$b_0$. As will be understood from the logical expression (1), the logic circuit 4 includes a logical product circuit for operating a logical product with respect to corresponding two bit signals, and a logical sum circuit for operating a logical sum with respect to a logical product signal obtained by a logical product processing. It is pointed out that these logical product circuit and logical sum circuit can be designed easily by those skilled in the art by reference to the logical expression (1).

Consequently, the logical sum circuit 4 outputs an output signal P indicating the result of the comparison between the two input data A and B. When the signal P is "0", a relation $|A| \geq |B|$ is satisfied between the input data A and B. On the other hand, when the signal P is "1", a relation $|A| < |B|$ is satisfied. That is, the output signal P indicating the result of the comparison between respective absolute values of two data A and B is output from the logic circuit 4.

A description will now be made on a signal processing in the absolute value comparator 100 shown in FIG. 1. Assume that "$-3_{10}$" and "$2_{10}$" are applied as input data A and B to be compared, respectively. With reference to the above table 1, during a first time period T0, the decoder circuit 1 converts two's complement representation data (A2, A1, A0)=(1, 0, 1) corresponding to the input data "$-3_{10}$" into conversion bit signals (a3, a2, a1, a0)=(0, 1, 1, 1). These conversion bit signals are once held in the register circuit 2.

During the next time period T1, binary representation data (0, 1, 0) corresponding to the other input data "2" are applied to the decoder circuit 1. The decoder circuit 1 converts the applied data into conversion bit signals (b3, b2, b1, b0)=(0, 0, 1, 1). The converted bit signals (0, 0, 1, 1) are applied to the logical circuit 4.

Accordingly, the logic circuit 4 receives (0, 1, 1, 1) and (0, 0, 1, 1) as inverted bit signals (/a3, /a2, /a1, /a0) and the conversion bit signals (b3, b2, b1, b0), respectively at the same time during the time period T1. Since the logic circuit 4 is constituted in accordance with the above-described logic expression (1), the logic circuit carries out the next logical operation on applied two sets of bit signals.

$$P = 1 \cdot 0 + 0 \cdot 0 + 0 \cdot 1 + 0 \cdot 1 = 0 \quad (2)$$

Since P="0" is obtained from the logical expression (2), a relation $|A| \geq |B|$ can be recognized on the basis of the output signal P.

In another example, "$-2_{10}$" and "$3_{10}$" are applied as input data A and B to be compared, respectively. With reference to the above table 1, the decoder circuit 1 outputs conversion bit signals (0, 0, 1, 1) corresponding to the input data "$-2_{10}$". Thus, (1, 1, 0, 0) are applied as the bit signals inverted by the inversion circuit 3 to the logic circuit 4. The other input data "$3_{10}$" is converted into conversion bit signals (0, 1, 1, 1) by the decoder circuit 1. The converted bit signals are applied to the logic circuit 4. Accordingly, the logical circuit 4 carries out a logical operation expressed by the following logical expression (3).

$$P = 1 \cdot 0 + 1 \cdot 1 + 0 \cdot 1 + 0 \cdot 1 = 1 \quad (3)$$

Since P="1" is obtained from the logical expression (3), a relation $|A| < |B|$ is recognized on the basis of the output signal P.

In still another example, "$-1_{10}$" and "$1_{10}$" are applied as input data A and B to be compared. Accordingly, the decoder circuit 1 outputs bit signals (0, 0, 0, 1) as bit signals (a3, a2, a1, a0) and (b3, b2, b1, b0). Thus, since the logic circuit 4 receives bit signals (1, 1, 1, 0) and (0, 0, 0, 1), a logical operation expressed by the following logical expression (4) is carried out.

$$P = 1 \cdot 0 + 1 \cdot 0 + 1 \cdot 0 + 0 \cdot 1 = 0 \quad (4)$$

Since P="0" is obtained, a relation $|A| \geq |B|$ is recognized.

As will be understood from the foregoing description, by use of the absolute value comparator 100 shown in FIG. 1, respective absolute values of sequentially applied two data A and B are compared to each other, and larger (or smaller) data is recognized on the basis of the output signal P.

Figure 3:
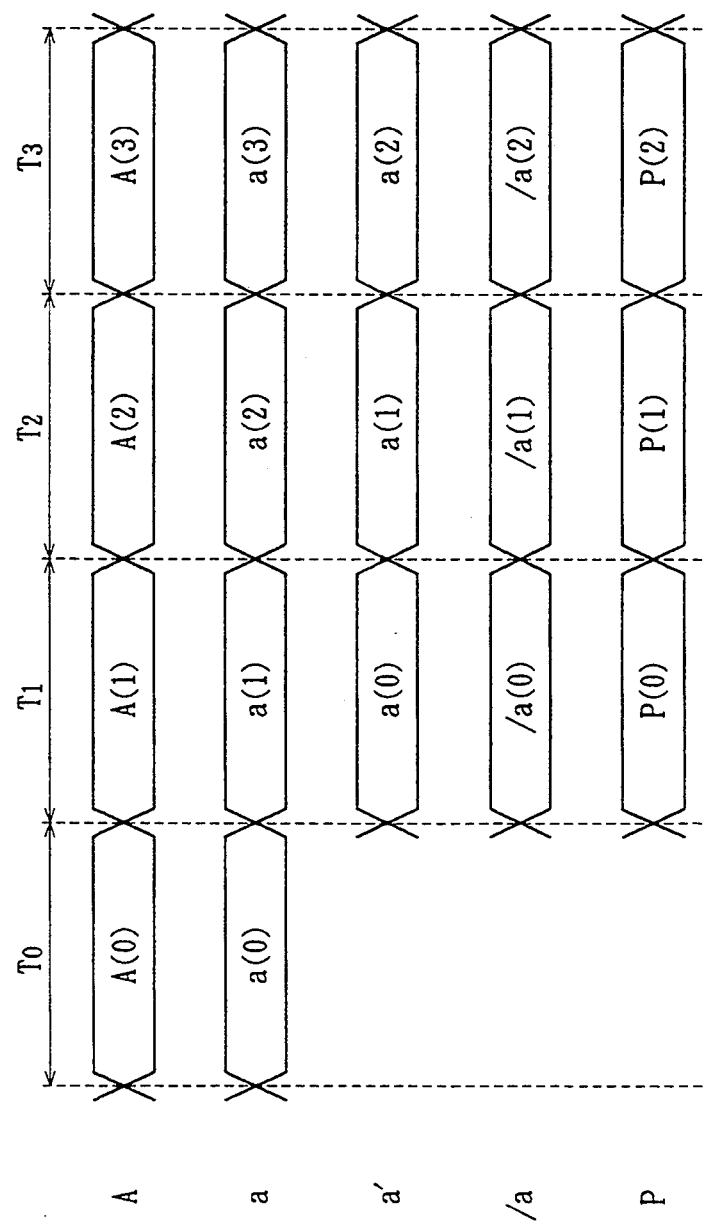
FIG. 3 is a timing chart for use in explaining a sequential processing of the absolute value comparator shown in FIG. 1.

FIG. 3 is a timing chart for use in explaining a sequential processing in the absolute value comparator 100 shown in FIG. 1. With reference to FIG. 3, input data A(0)–A(3) are sequentially applied to the decoder circuit 1 during time periods T0–T3. The decoder circuit 1 outputs conversion bit signals a(0)–a(3) during the periods T0–T3, respectively. The register circuit 2 holds applied bit signals for only a time length corresponding to one time period. Thus, since the register circuit 2 outputs the held bit signal a(0) in the time period T1, an inverted bit signal /a(0) is output via the inversion circuit 3 during this period T1. As a result, during this period T1, the bit signal /a(0) of the previously applied data A(0) and the bit signal a(1) of the subsequently applied data A(1) are applied simultaneously to the logic circuit 4. Consequently, an output signal P(0) indicating the result of the comparison between the absolute values of the input data A(0) and A(1) is output via the logic circuit 4 during the period T1.

Similarly, a comparison is made between respective absolute values of the next pair of input data A(1) and A(2) during the next period T2. A signal P(1) indicating the result of the comparison between the absolute values of the input data A(1) and A(2) is output from the logic circuit 4 during the period T2. Further, a comparison processing is made between respective absolute values of the input data A(2) and A(3) during the subsequent period T3. A signal P(2) indicating the result of the comparison is output from the logic circuit 4 during the period T3.

As will be understood from FIG. 3, the absolute value comparator 100 shown in FIG. 1 compares two adjacent data on a time base, of the sequentially applied input data, and sequentially outputs a signal P indicating the result of the comparison between the two adjacent data. Since the absolute value comparator 100 shown in FIG. 1 does not use a full adder, the comparator has no problem of the delay caused by the use of the full adder. That is, the comparator is able to perform a comparison processing of absolute values at a high speed. It is also pointed out that the absolute value comparator 100 shown in FIG. 1 has an extremely simple circuit configuration.

Figure 4:
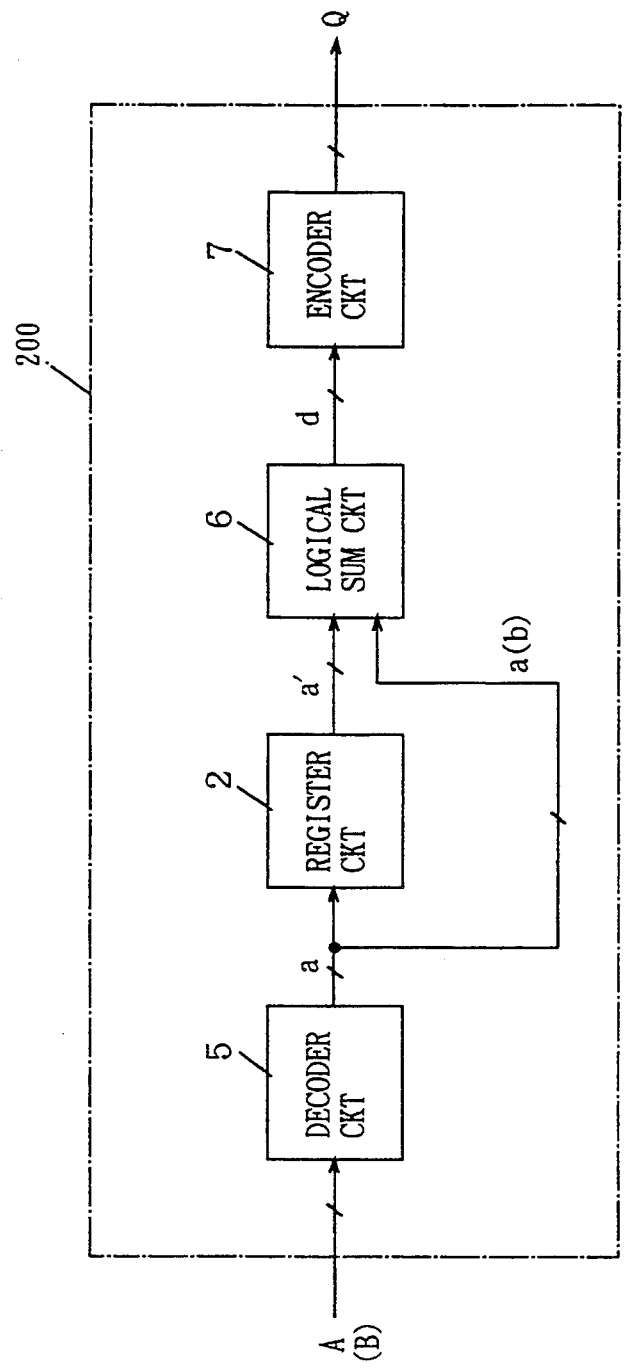
FIG. 4 is a block diagram of an absolute value comparator showing another embodiment of the present invention.

FIG. 4 is a block diagram of an absolute comparator showing another embodiment of the present invention. With reference to FIG. 4, this absolute value comparator 200 includes a decoder circuit 5 for receiving sequentially applied input data A, a register circuit 2 for receiving a bit signal a output from the decoder circuit 5, a logical sum circuit 6 for receiving a bit signal a' held by the register circuit 2 and the bit signal a (and b) from the decoder circuit 5, and an encoder circuit 7 for receiving an output bit signal d of the logical sum circuit 6.

In this embodiment also, the decoder circuit 5 receives input data A represented in the two's complement notation. The decoder circuit 5 converts two's complement representation data (A2, A1, A0) into conversion bit signals (A6, A5, ..., A0) in accordance with a rule shown in the following table 2.

TABLE 2

| Decimal notation | Two's complement notation | | | Conversion bit signals | | | | | | |
|---|---|---|---|---|---|---|---|---|---|---|
| | A2 | A1 | A0 | a6 | a5 | a4 | a3 | a2 | a1 | a0 |
| −1 | 1 | 1 | 1 | 0 | 0 | 0 | 0 | 0 | 0 | 1 |
| −2 | 1 | 1 | 0 | 0 | 0 | 0 | 0 | 0 | 1 | 1 |
| −3 | 1 | 0 | 1 | 0 | 0 | 1 | 1 | 1 | 1 | 1 |
| −4 | 1 | 0 | 0 | 1 | 1 | 1 | 1 | 1 | 1 | 1 |
| 3 | 0 | 1 | 1 | 0 | 1 | 1 | 1 | 1 | 1 | 1 |

TABLE 2-continued

| Decimal notation | Two's complement notation | | | Conversion bit signals | | | | | | |
|---|---|---|---|---|---|---|---|---|---|---|
| | A2 | A1 | A0 | a6 | a5 | a4 | a3 | a2 | a1 | a0 |
| 2 | 0 | 1 | 0 | 0 | 0 | 0 | 1 | 1 | 1 | 1 |
| 1 | 0 | 0 | 1 | 0 | 0 | 0 | 0 | 0 | 1 | 1 |
| 0 | 0 | 0 | 0 | 0 | 0 | 0 | 0 | 0 | 0 | 0 |

For example, when input data is "$3_{10}$", binary representation data (1, 1, 1) are applied to the decoder circuit 5. The decoder circuit 5 outputs conversion bit signals (0, 1, 1, 1, 1, 1, 1) in accordance with the rule of Table 2. These conversion bit signals are applied to the register circuit 2 and the logical sum circuit 6.

Assuming that two sets of bit signals $a_n$–$a_0$ and $b_n$–$b_0$ are applied to the logic sum circuit 6, the logic sum circuit 6 is constituted by a logic circuit expressed by the following logical expressions ($5_n$)–($5_0$).

$$d_n = a_n + b_n \qquad (5_n)$$
$$d_{n-1} = a_{n-1} + b_{n-1} \qquad (5_{n-1})$$
$$\vdots$$
$$d_0 = a_0 + b_0 \qquad (5_0)$$

That is, the logic sum circuit 6 carries out a logical sum operation on corresponding bits of the applied two sets of bit signals and outputs bit signals $d_n$–$d_0$ indicating the result of the respective operations. The output bit signals $d_n$–$d_0$ are applied to the encoder circuit 7.

The encoder circuit 7 carries out an inverse conversion in accordance with the above-described table 2. That is, the encoder circuit 7 converts the bit signals $d_n$–$d_0$ into their corresponding two's complement representation data in accordance with the rule shown in Table 2. As a result, larger data of the two 2's complement representation data applied to the absolute value comparator 200 is output as output data Q in accordance with the two's complement representation from the encoder circuit 7.

Figure 5:
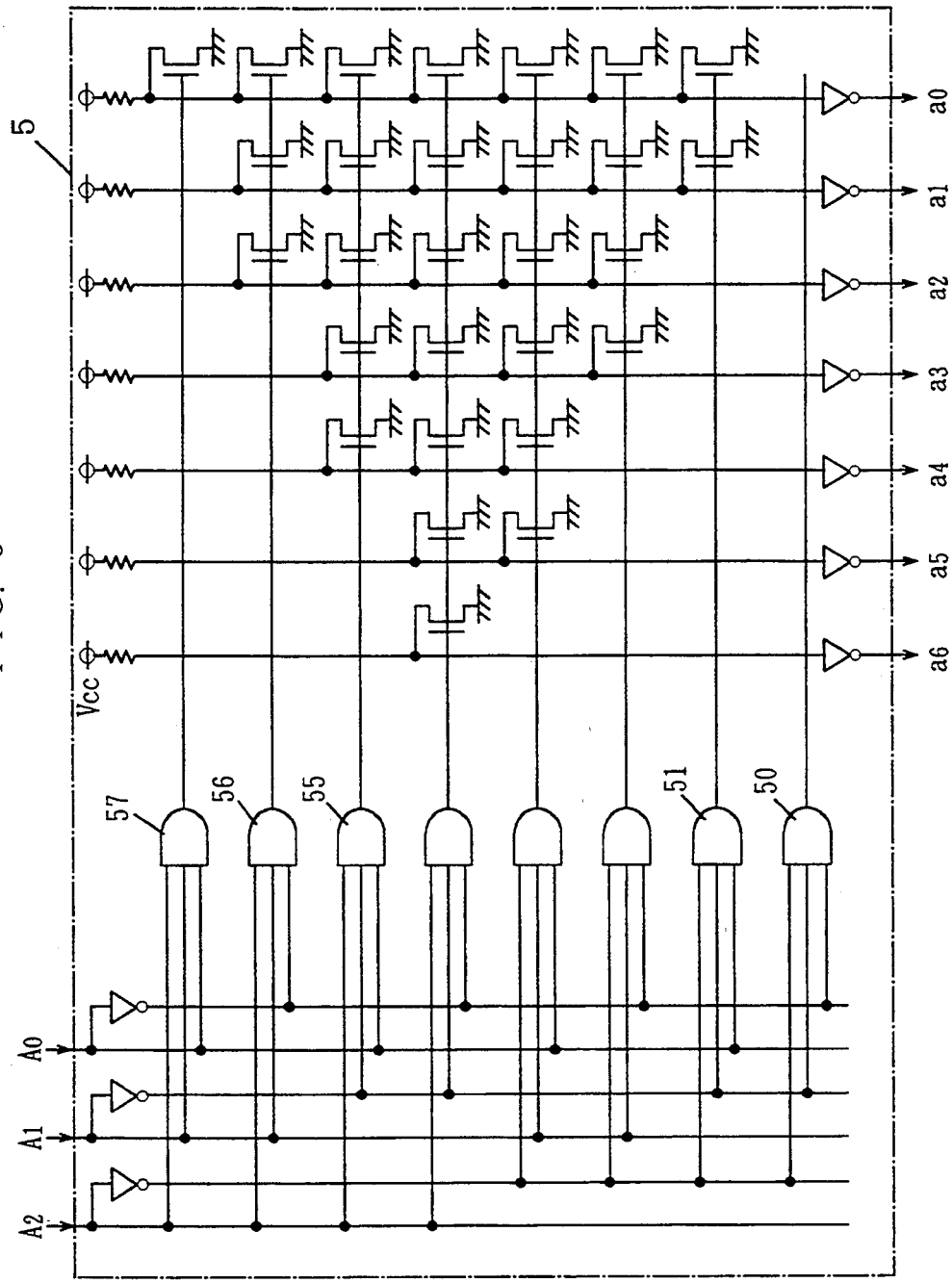
FIG. 5 is a schematic diagram of a decoding circuit shown in FIG. 4.

FIG. 5 is a schematic diagram of the decoder circuit shown in FIG. 4. With reference to FIG. 5, the decoder circuit 5 includes AND gates 50–57 connected to selectively receive bit signals A2, A1, A0 of two's complement representation data and their inversion signals. For example, when input data is "$-3_{10}$", two's complement representation data (A2, A1, A0) of (1, 0, 1) are applied. Thus, only the AND gate 55 outputs an output signal of "1" (or a logic high level). Consequently, (0, 0, 1, 1, 1, 1, 1) are output as conversion bit signals (a6, a5, ..., a0). Apparently, this conversion is in accordance with the rule shown in the foregoing table 2.

In another example, when input data is "$0_{10}$", two's complement representation data (0, 0, 0) are applied. Only the AND gate 50 outputs a signal of a logic high level. Thus, conversion bit signals (0, 0, 0, 0, 0, 0, 0) are output.

Figure 6:
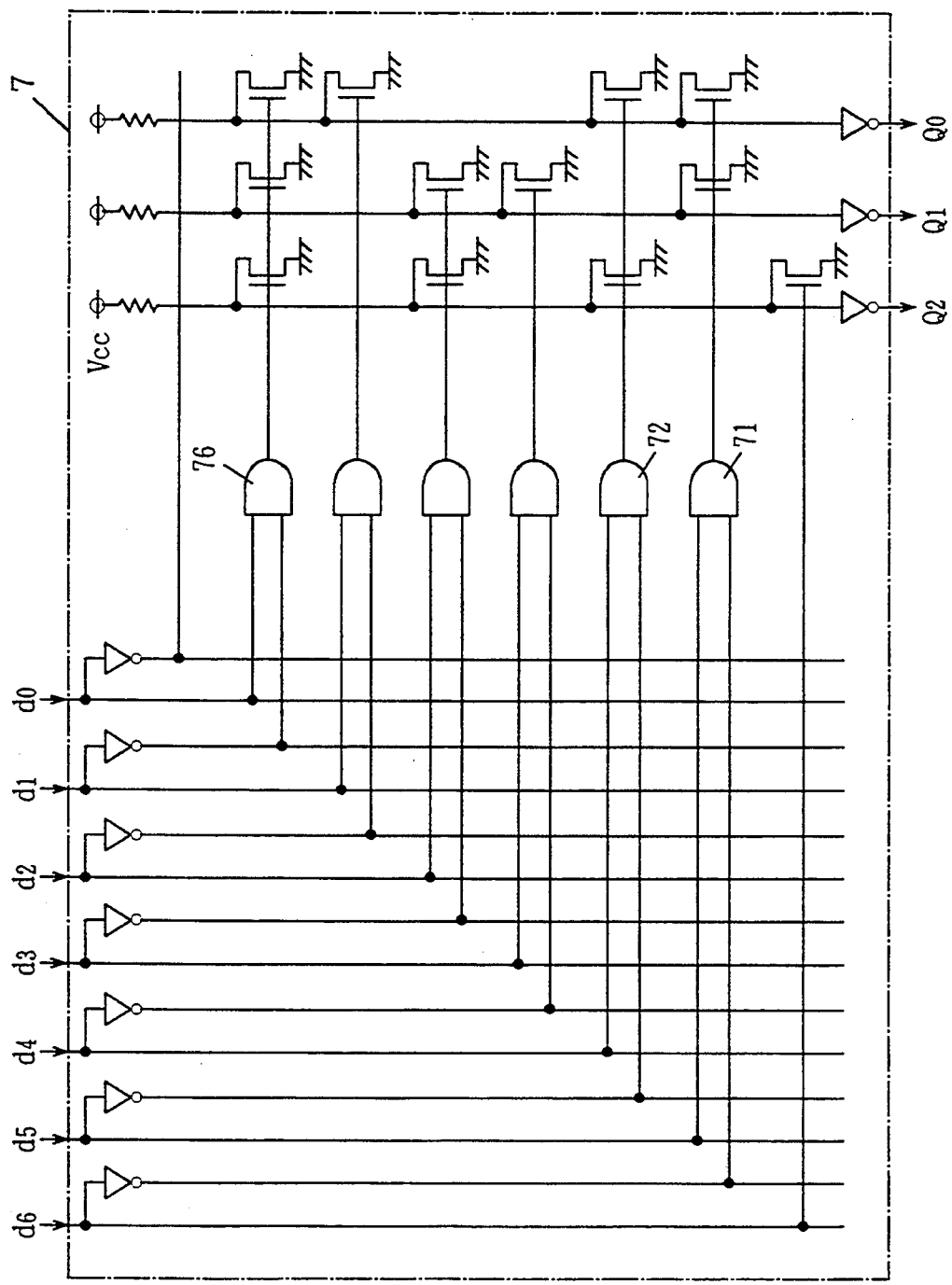
FIG. 6 is a schematic diagram of an encoding circuit shown in FIG. 4.

FIG. 6 is a schematic diagram of the encoder circuit 7 shown in FIG. 4. With reference to FIG. 6, this encoder circuit 7 includes AND gates 71–76 connected to selectively receive bit signals d6, d5, ..., d0 and their inversion signals. For example, when the bit signals (d6, d5, ..., d0) are (0, 0, 1, 1, 1, 1, 1), only the AND gate 72 outputs an output signal of "1". Thus, (1, 0, 1) are output as two's complement representation data (Q2, Q1, Q0). This conversion apparently corresponds to the inverse conversion in accordance with the rule shown in Table 2.

A description will now be made on a comparison processing in the absolute value comparator shown in FIG. 4. For example, assume that two input data A and B to be compared are "$-3_{10}$" and "$2_{10}$". During a first time period T0, two's complement representation data (1, 0, 1) corresponding to "$-3_{10}$" are applied to the decoder circuit 5. The decoder circuit 5 applies (0, 0, 1, 1, 1, 1, 1) as conversion bit signals (a6, a5, ..., a0) to the register circuit 2 in accordance with the rule of Table 2. The bit signals held once in the register circuit 2 are applied to the logical sum circuit 6 during the next time period T1.

During the next time period T1, binary representation data (0, 1, 0) corresponding to the other input data "$2_{10}$" are applied to the decoder circuit 5. The decoder circuit 5 outputs conversion bit signals (0, 0, 0, 1, 1, 1, 1) as conversion bit signals (b6, b5, ..., b0) in accordance with the rule of Table 2.

Accordingly, since the bit signals (0, 0, 1, 1, 1, 1, 1) and (0, 0, 0, 1, 1, 1, 1) are applied simultaneously to the logical sum circuit 6 during the subsequent time period T1, the logical sum circuit 6 outputs (0, 0, 1, 1, 1, 1, 1) as output bit signals (d6, d5, ..., d0). These output bit signals are applied to the encoder circuit 7 and then subjected to the inverse conversion in accordance with the rule of Table 2 by the encoder circuit 7. As a result, binary representation data (1, 0, 1) are output as output data (Q2, Q1, Q0) of the encoder circuit 7. The output data correspond to "$-3_{10}$" in a decimal representation. It is thus understood that data having a larger absolute value, of the applied two input data "$-3_{10}$" and "$2_{10}$", is output.

Figure 7:
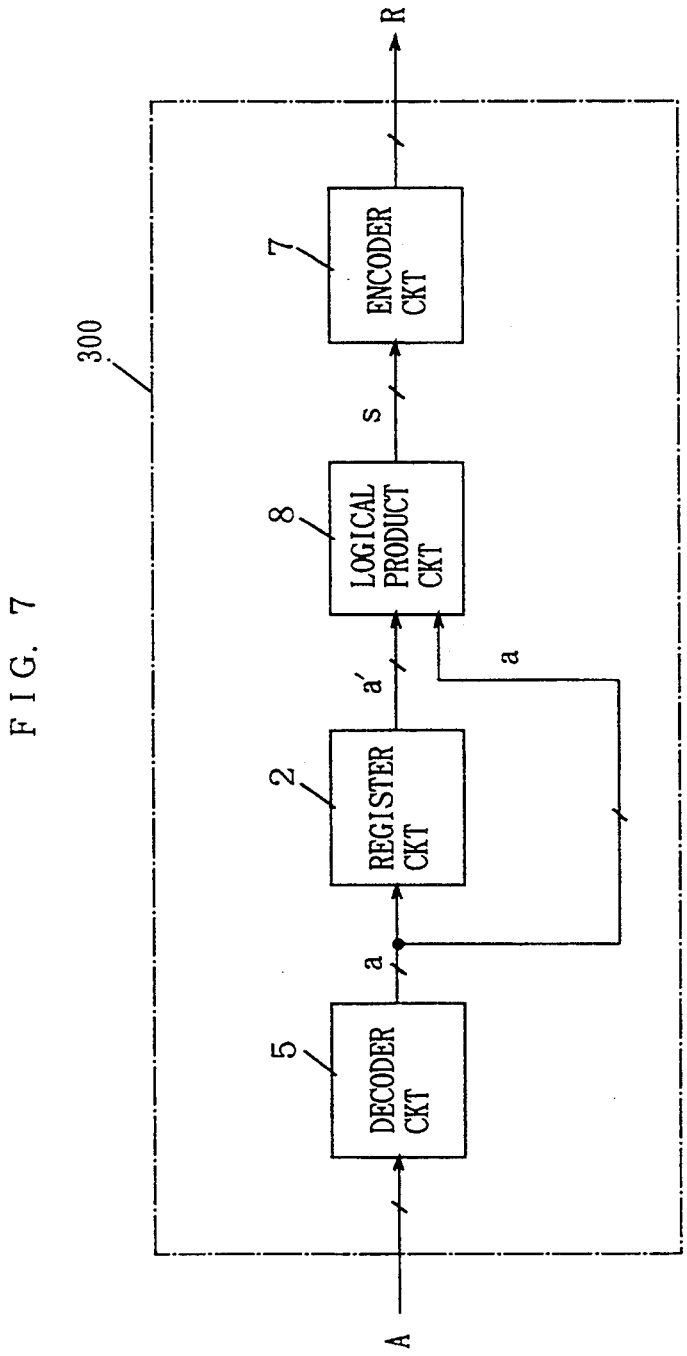
FIG. 7 is a block diagram of an absolute value comparator showing still another embodiment of the present invention.

FIG. 7 is a block diagram of an absolute value comparator showing still another embodiment of the present invention. With reference to FIG. 7, this absolute value comparator 300 includes a logical product circuit 8 in place of the logical sum circuit 6 as compared to the absolute value comparator 200 shown in FIG. 4. Other circuit configurations, i.e., the decoder circuit 5, the register circuit 2 and the encoder circuit 7 are identical to those shown in FIG. 4. That is, the decoder circuit 5 and the encoder circuit 7 carry out a conversion processing between two's complement representation data and bit signals in accordance with the rule of the foregoing table 2.

The logical product circuit 8 is constituted by a logic circuit expressed by the following logical expressions.

$$s_n = a_n \cdot b_n \quad (6_n)$$
$$s_{n-1} = a_{n-1} \cdot b_{n-1} \quad (6_{n-1})$$
$$\vdots$$
$$s_0 = a_0 \cdot b_0 \quad (6_0)$$

That is, the logical product circuit 8 carries out a logical product operation on each of corresponding bits of applied two sets of bit signals, and outputs bit signals $s_n$–$s_0$ indicating the result of the operation. The output bit signals $s_n$–$s_0$ are applied to the encoder circuit 7 and then converted into binary representation data by the encoder circuit 7.

A description will now be made on a comparison processing in the absolute value comparator 300 shown in FIG. 7. For example, assume that "$-3_{10}$" and "$2_{10}$" are sequentially applied as input data A and B. During a first time period T0, the decoder circuit 5 receives two's complement representation data (1, 0, 1) and outputs (0, 0, 1, 1, 1, 1, 1) as conversion bit signals (a6, a5, ..., a0). During the next time period T1, the decoder circuit 5 receives two's complement representation data (0, 1, 0) and outputs (0, 0, 0, 1, 1, 1, 1) as conversion bit signals (b6, b5, ..., b0).

Accordingly, the bit signals (0, 0, 1, 1, 1, 1, 1) and (0, 0, 0, 1, 1, 1, 1) are applied simultaneously to the logical product circuit 8 during the subsequent time period T1. The logical product circuit 8 carries out a logical product operation on the applied bit signals. Thus, the logical product circuit 8 outputs (0, 0, 0, 1, 1, 1, 1) as output bit signals (s6, s5, ..., s0). These output bit signals are applied to the encoder circuit 7, so that two's complement representation data (R2, R1, R0)=(0, 1, 0) are output from the encoder circuit 7. The output data correspond to "$2_{10}$" in the decimal notation. Thus, it is understood that the absolute value comparator 300 shown in FIG. 7 outputs data having a smaller absolute value (two's complement representation data) of the applied two data.

In any absolute value comparators 100, 200 and 300 shown in the foregoing embodiments, i.e., FIGS. 1, 4 and 7, two data to be compared are sequentially applied on the time base, and respective absolute values are compared with each other for adjacent two data. The following description is given on an embodiment in which two data to be compared are applied in parallel.

Figure 8:
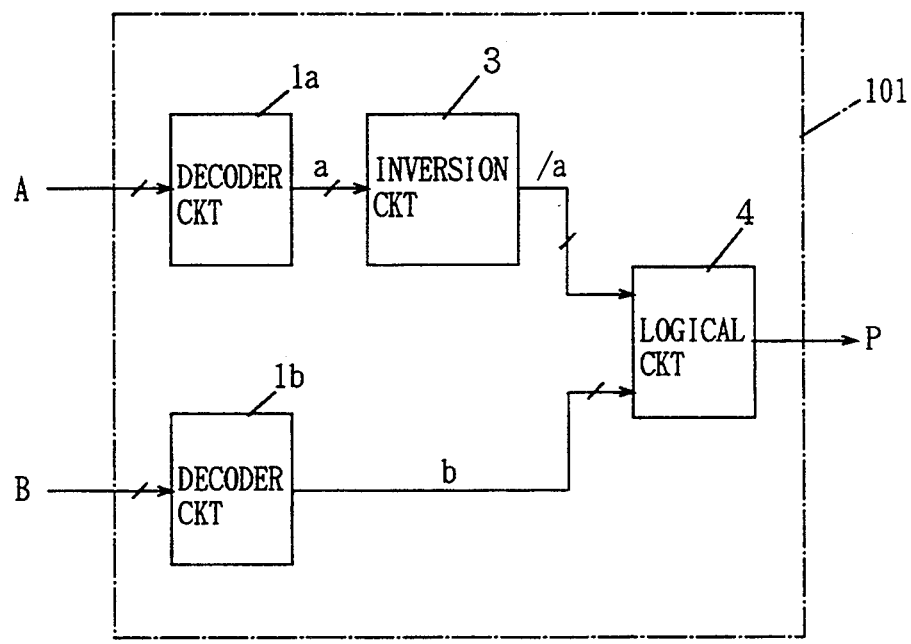
FIG. 8 is a block diagram of an absolute value comparator showing still another embodiment of the present invention.

FIG. 8 is a block diagram of an absolute value comparator showing still another embodiment of the present invention. With reference to FIG. 8, this absolute value comparator 101 includes two decoder circuits 1a and 1b for receiving input data A and B, respectively, an inversion circuit 3 connected to an output of the decoder circuit 1a and a logic circuit 4 for receiving output bit signals b and /a from the decoder circuit 1b and the inversion circuit 3. Each of the decoder circuits 1a and 1b has the same circuit configuration as that of the decoder circuit 1 shown in FIG. 1 (i.e., the decoder circuit 1 shown in FIG. 2). The inversion circuit 3 and the logic circuit 4 have the same circuit configurations as those of the inversion circuit 3 and the logic circuit 4 shown in FIG. 1. Therefore, the absolute value comparator 101 shown in FIG. 8 carries out basically the same comparison processing as that of the absolute value comparator 100 shown in FIG. 1, except a parallel processing which will be described later.

Figure 9:
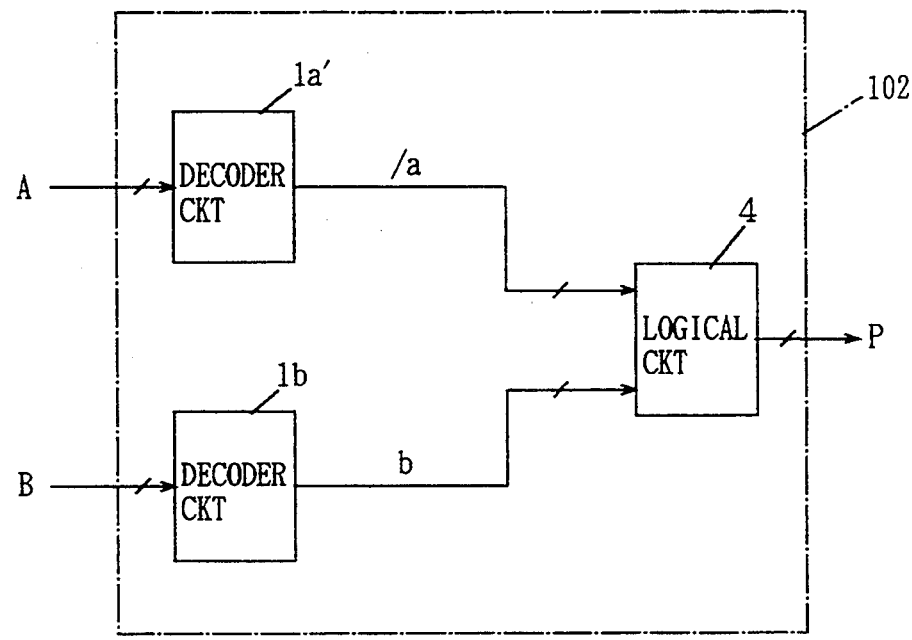
FIG. 9 is a block diagram of an absolute value comparator showing still another embodiment of the present invention.

FIG. 9 is a block diagram of an absolute value comparator showing still another embodiment of the present invention. With reference to FIG. 9, this absolute value comparator 102 includes an improved decoder circuit 1a' for receiving input data A, a decoder circuit 1b for receiving input data B, and a logic circuit 4 for receiving conversion bit signals /a and b from the decoder circuits 1a' and 1b. The decoder circuit 1b and the logic circuit 4 have the same circuit configuration as those of the decoder circuit 1 and the logic circuit 4 shown in FIG. 1. On the other hand, the improved decoder circuit 1a' has a circuit configuration in which inverters 16–19 are removed from the decoder circuit 1 shown in FIG. 2. Therefore, by use of the improved decoder circuit 1a', an inversion circuit 3 is unnecessary in this absolute value comparator 102.

Figure 10:
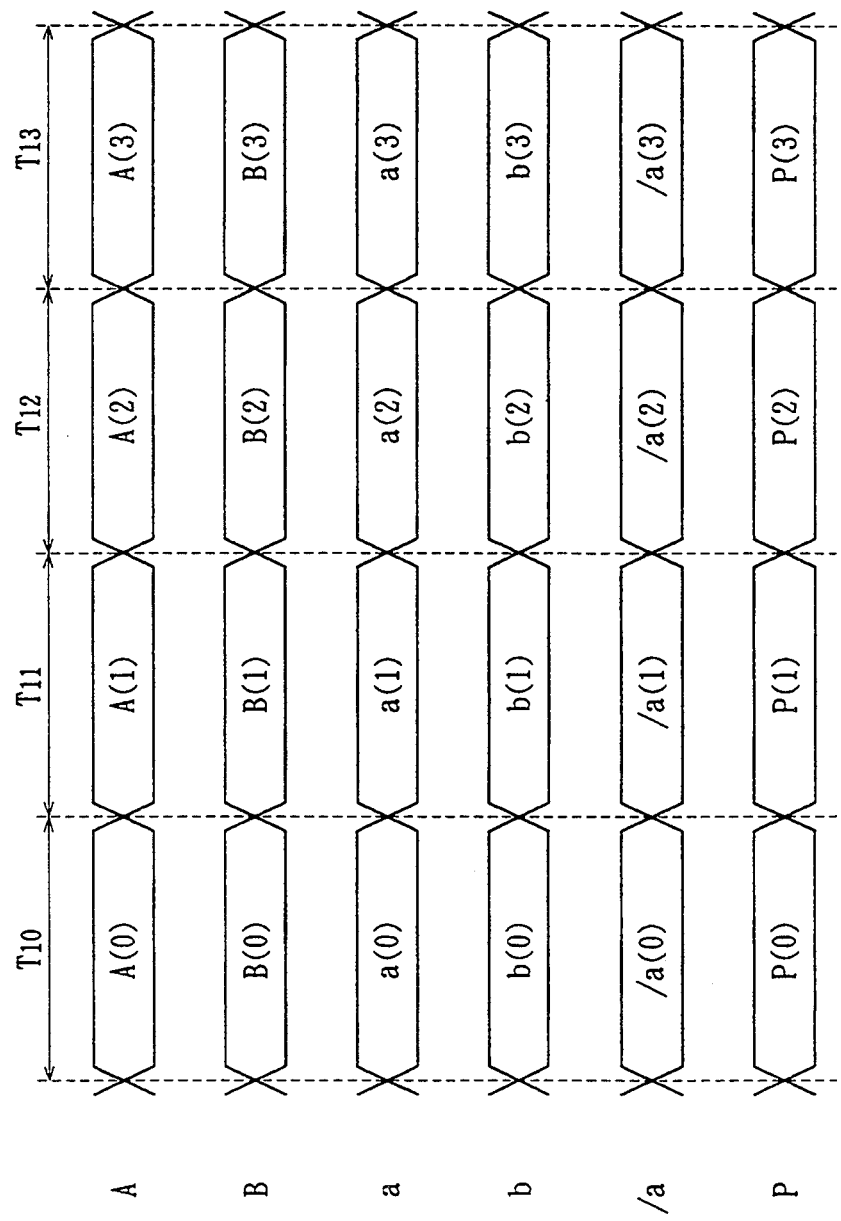
FIG. 10 is a timing chart for use in explaining a parallel processing in the absolute value comparators shown in FIGS. 8 and 9.

FIG. 10 is a timing chart for use in explaining a parallel processing in the absolute value comparators 101 and 102 shown in FIGS. 8 and 9. In the embodiment shown in FIG. 8, during a time period T10, two input data A(0)

and B(0) to be compared are applied simultaneously to the decoder circuits 1a and 1b. Thus, the decoder circuits 1a and 1b output conversion bit signals a and b, respectively. The inversion circuit 3 receives the conversion bit signal a to immediately output an inverted bit signal /a. Accordingly, since the logic circuit 4 receives the two bit signals /a and b during the time period T10, the logic circuit 4 outputs an output signal P(0) indicating the result of comparison during the period T10.

The same comparison processing is carried out in other time periods T11–T13. That is, respective absolute values of applied two data A and B are compared to each other for each period T11–T13, and an output signal P indicating the result of comparison is output in the corresponding period.

Figure 11:
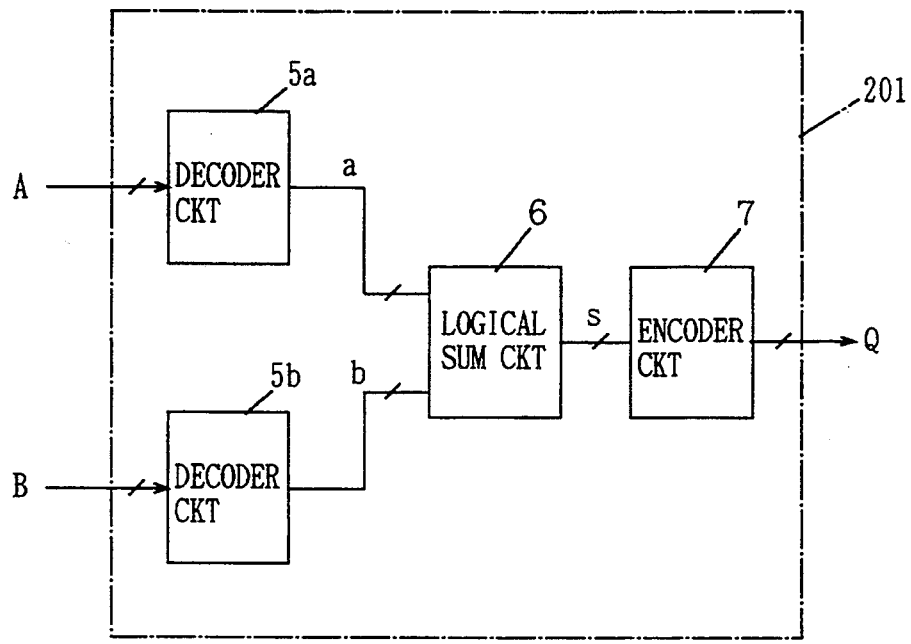
FIG. 11 is a block diagram of an absolute value comparator showing still another embodiment of the present invention.

FIG. 11 is a block diagram of an absolute value comparator showing still another embodiment of the present invention. With reference to FIG. 11, this absolute value comparator 201 includes decoder circuits 5a and 5b for receiving input data A and B, a logical sum circuit 6 for receiving conversion bit signals A and B from the decoder circuits 5a and 5b, and an encoder circuit 7 for receiving an output bit signal s from the logical sum circuit 6. Each of the decoder circuits 5a and 5b has the same circuit configuration as that of the decoder circuit 5 shown in FIG. 4 (i.e., the circuit 5 shown in FIG. 5). The logic sum circuit 6 and the encoder circuit 7 also have the same circuit configurations as those of the logic sum circuit 6 and the encoder circuit 7 shown in FIG. 4. That is, the absolute value comparator 201 shown in FIG. 11 corresponds to a parallel processing version of the absolute value comparator 200 of FIG. 4 and carries out basically the same comparison processing as done by the absolute comparator 200.

Figure 12:
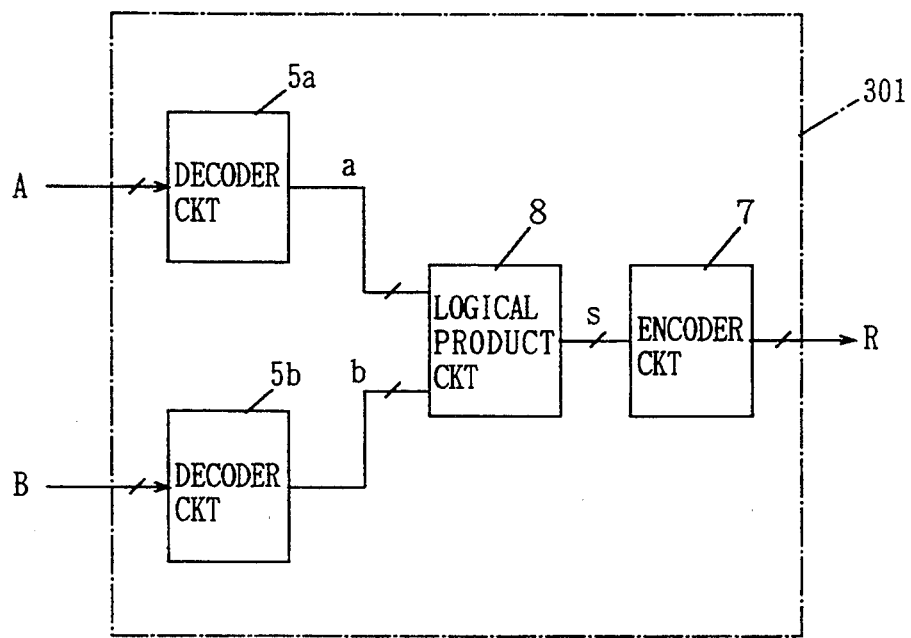
FIG. 12 is a block diagram of an absolute value comparator showing still another embodiment of the present invention.

FIG. 12 is a block diagram of an absolute value comparator showing still another embodiment of the present invention. With reference to FIG. 12, this absolute value comparator 301 includes decoder circuits 5a and 5b for receiving input data A and B, respectively, a logical product circuit 8 for receiving conversion bit signals a and b from the decoder circuits 5a and 5b, and an encoder circuit 7 for receiving an output bit signal s from the logical product circuit 8. That is, the absolute value comparator 301 shown in FIG. 12 corresponds to a parallel processing version of the absolute value comparator 300 shown in FIG. 7 and carries out basically the same comparison processing as done by the absolute value comparator 300.

Figure 13:
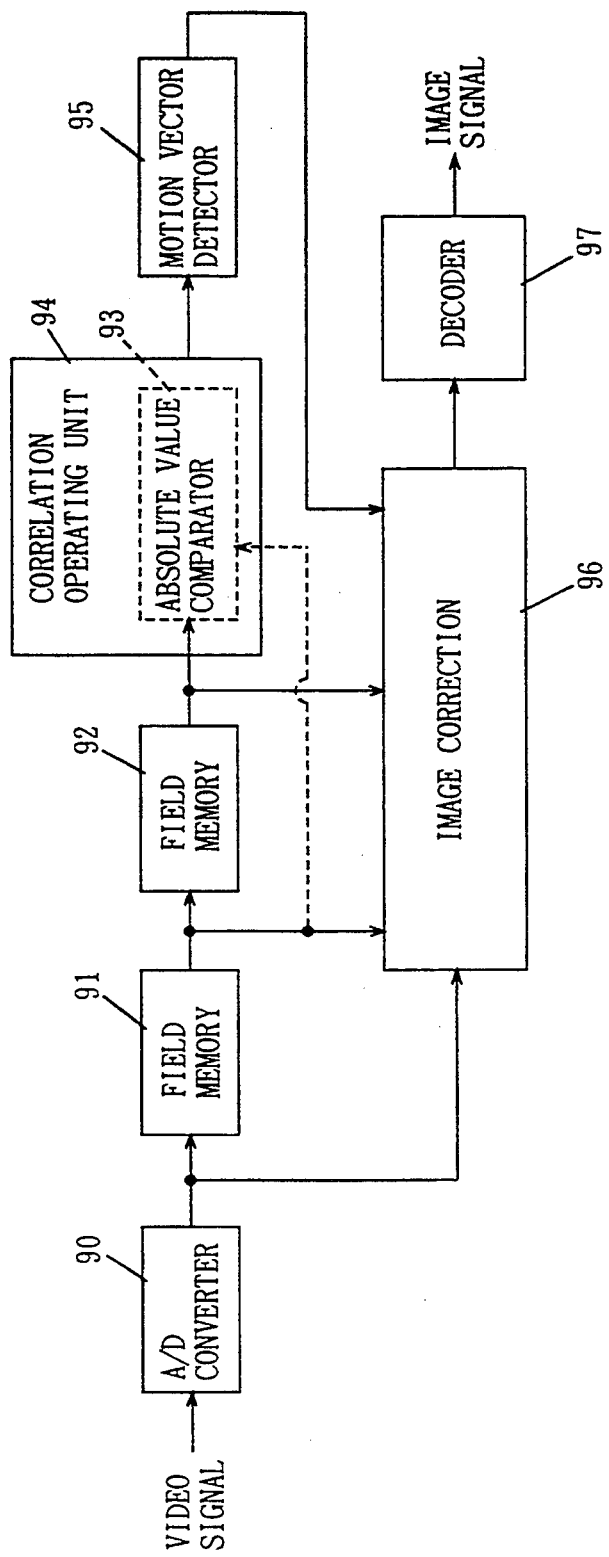
FIG. 13 is a block diagram of a video signal processing apparatus employing an absolute value comparator.

As described above, any of the foregoing absolute value comparators employ no full adder and can be implemented with an extremely simplified circuit configuration. Thus, since the delay caused by the use of the full adder no longer occurs, a comparison between absolute values of applied data can be made in a short time. Therefore, those absolute value comparators are applicable to a video signal processing apparatus as, for example, the absolute value comparator 93 in the correlation operating unit 94 shown in FIG. 13.

In addition, since sequential processing type absolute value comparators (the absolute value comparators 100, 200 and 300 shown in FIGS. 1, 4 and 7) and parallel processing type absolute value comparators (the absolute value comparators 101, 102, 201 and 301 shown in FIGS. 8, 9, 11 and 12) are provided, those absolute value comparators are selectively applicable depending on applicable fields of art.

While the description has been made on the examples in which the absolute value comparator in accordance with the present invention is implemented by hardware, i.e., an electronic circuit in the foregoing embodiments, it is pointed out that the absolute value comparator in accordance with the present invention can be constituted also by software, i.e., programming.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An absolute value comparing apparatus for comparing respective absolute values of first and second data, comprising:

conversion means for converting first and second data into first and second conversion bit signals each having a plurality of bits in accordance with a predetermined rule, each of said first and second conversion bit signals having the number of bits indicating a first logic increased in proportion to an absolute value of corresponding data of said first and second data;

inversion means for inverting each bit of said first conversion bit signals to output inversion bit signals;

logical product means for operating a logical product for each of corresponding bits between said second conversion bit signals and the inversion bit signals to output a plurality of logical product signals; and logical sum means for operating a logical sum with respect to said plurality of logical product signals to output a logical sum signal.

2. The absolute value comparing apparatus as recited claim 1, wherein said first and second data are sequentially applied to said conversion means during adjacent two time periods on a time base, and said conversion means sequentially converts the first and second data into the first and second conversion bit signals, said absolute value comparing apparatus further comprising holding means for holding the first conversion bit signals provided from said conversion means during one time period, wherein said inversion means inverts each bit of the first conversion bit signals provided from said holding means to output the inversion bit signals.

3. The absolute value comparing apparatus as recited in claim 1, wherein said first and second data are applied to said conversion means simultaneously, said conversion means includes:

first conversion means for converting the first data into the first conversion bit signals having a plurality of bits in accordance with said predetermined rule, and second conversion means for converting the second data into the second conversion bit signals having a plurality of bits in accordance with said predetermined rule, and said inversion means is connected to an output of said first conversion means.

4. The absolute value comparing apparatus as recited in claim 1, wherein each of the first and second data is represented in accordance with a two's complement notation.

5. The absolute value comparing apparatus as recited in claim 1, wherein
said first logic is a logic "1", and
each of said first and second conversion bit signals has the number of bits indicating the logic "1" increased in proportion to an absolute value of corresponding data of said first and second data.

6. An absolute value comparing apparatus for comparing respective absolute values of first and second data, comprising:
conversion means for converting the first and second data into first and second conversion bit signals each having a plurality of bits in accordance with a predetermined rule,
each of said first and second conversion bit signals having the number of bits indicating a first logic increased in proportion to an absolute value of corresponding data of said first and second data;
logical sum means for operating a logical sum for each of corresponding bits between the first and second conversion bit signals to output a plurality of logical sum signals; and
inverse conversion means for inversely converting said plurality of logical sum signals in accordance with said predetermined rule to selectively output one of said first and second data.

7. The absolute value comparing apparatus as recited in claim 6, wherein
said first and second data are applied sequentially to said conversion means during adjacent two time periods on a time base, and
said conversion means sequentially converts the first and second data into the first and second conversion bit signals,
said absolute value comparing apparatus further comprising holding means for holding the first conversion bit signals provided from said conversion means during one time period, wherein
said logical sum means receives the first conversion bit signals provided from said holding means and the second conversion bit signals provided from said conversion means.

8. The absolute value comparing apparatus as recited in claim 6, wherein
said first and second data are applied to said conversion means simultaneously,
said conversion means includes:
first conversion means for converting the first data into the first conversion bit signals having a plurality of bits in accordance with said predetermined rule, and
second conversion means for converting the second data into the second conversion bit signals having a plurality of bits in accordance with said predetermined rule, and
said logical sum means is connected to respective outputs of said first and second conversion means.

9. The absolute value comparing apparatus as recited in claim 6, wherein
each of the first and second data is represented in accordance with a two's complement notation.

10. The absolute value comparing apparatus as recited in claim 6, wherein
said first logic is a logic "1", and
each of said first and second conversion bit signals has the number of bits indicating the logic "1" increased in proportion to an absolute value of corresponding data of said first and second data.

11. An absolute value comparing apparatus for comparing respective absolute values of first and second data, comprising:
conversion means for converting the first and second data into first and second conversion bit signals each having a plurality of bits in accordance with a predetermined rule,
each of said first and second conversion bit signals having the number of bits indicating a first logic increased in proportion to an absolute value of corresponding data of said first and second data;
logical product means for operating a logical product for each of corresponding bits between the first and second conversion bit signals to output a plurality of logical product signals; and
inverse conversion means for inversely converting said plurality of logical product signals in accordance with said predetermined rule to selectively output one of said first and second data.

12. The absolute value comparing apparatus as recited in claim 11, wherein
said first and second data are applied sequentially to said conversion means during adjacent two time periods on a time base,
said conversion means converts the first and second data sequentially into the first and second conversion bit signals,
said absolute value comparing apparatus further comprising holding means for holding the first conversion bit signals provided from said conversion means during one time period, wherein
said logical product means receives the first conversion bit signals provided from said holding means and the second conversion bit signals provided from said conversion means.

13. The absolute value comparing apparatus as recited in claim 11, wherein
said first and second data are applied to said conversion means simultaneously,
said conversion means includes:
first conversion means for converting the first data into the first conversion bit signals having a plurality of bits in accordance with said predetermined rule, and
second conversion means for converting the second data into the second conversion bit signals having a plurality of bits in accordance with said predetermined rule, and
said logical product means is connected to respective outputs of said first and second conversion means.

14. The absolute value comparing apparatus as recited in claim 11, wherein
each of said first and second data is represented in accordance with a two's complement notation.

15. The absolute value comparing apparatus as recited in claim 11, wherein
said first logic is a logic "1", and
each of said first and second conversion bit signals has the number of bits indicating the logic "1" increased in proportion to an absolute value of corresponding data of said first and second data.

* * * * *